United States Patent Office 2,819,865
Patented Jan. 14, 1958

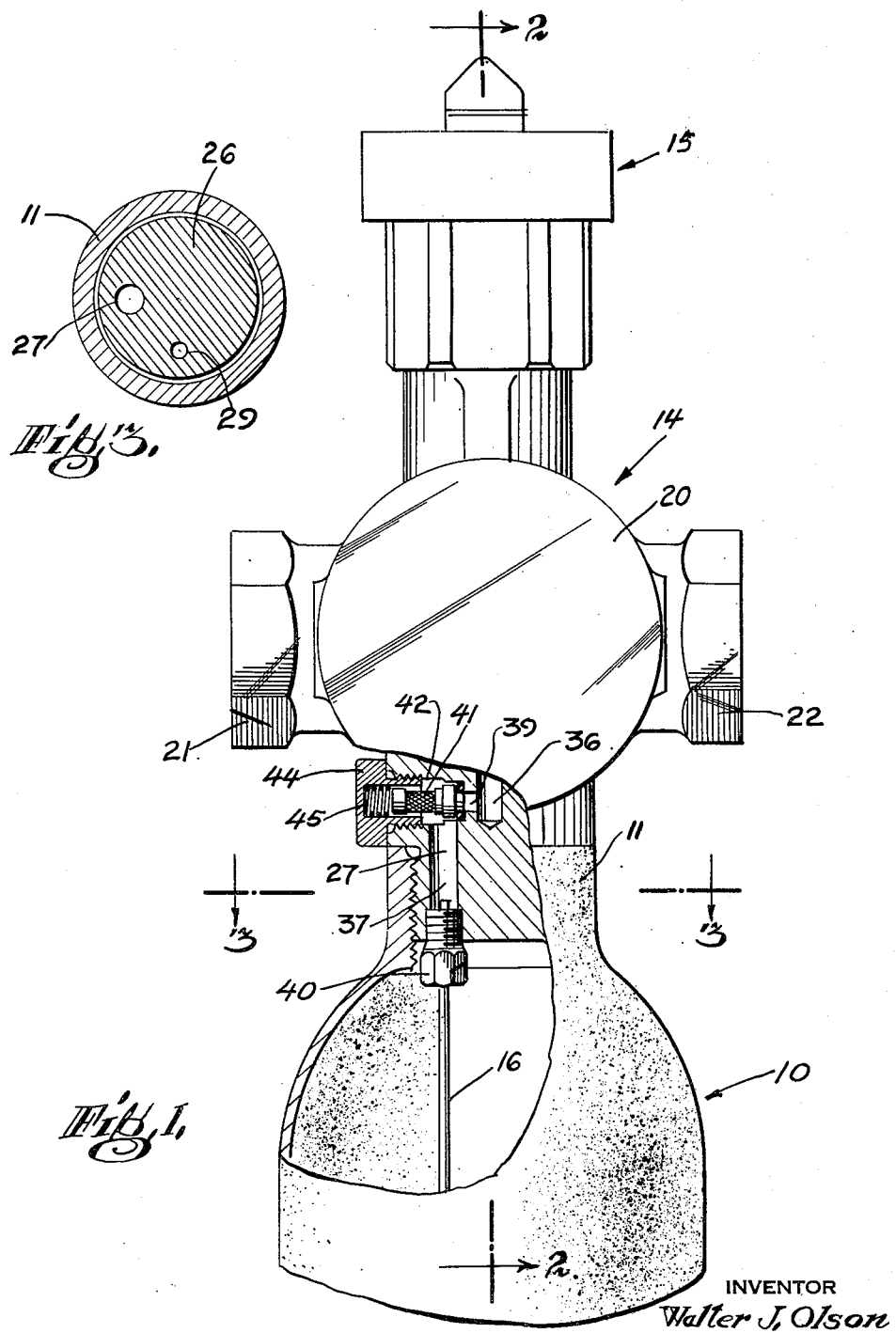

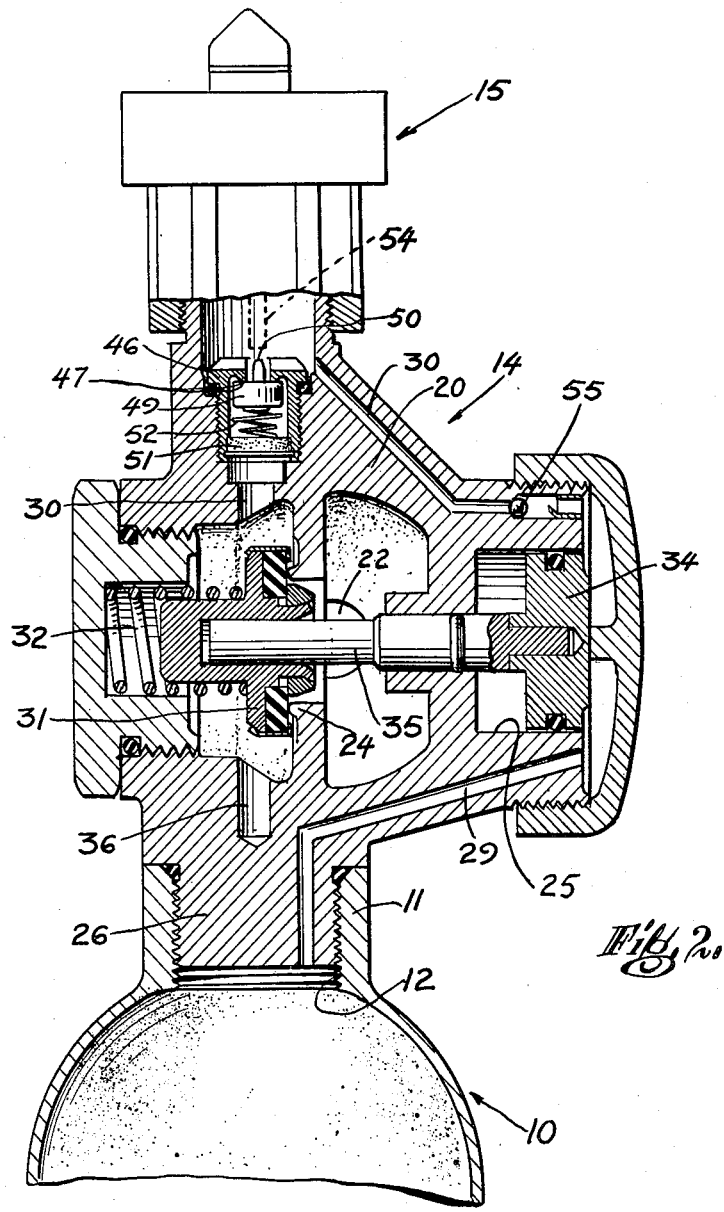

2,819,865

FLUID PRESSURE CONTROLLED TIME DELAY APPARATUS

Walter J. Olson, Bloomfield, N. J., assignor to Specialties Development Corporation, Belleville, N. J., a corporation of New Jersey Application August 11, 1954, Serial No. 449,219

4 Claims. (Cl. 251—25)

The present invention relates to fluid pressure controlled time delay apparatus, and, more particularly, to an improved valve assembly for time delay apparatus.

An object of the present invention is to provide a simple, compact and economical valve assembly adapted for direct connection to a chamber into which carbon dioxide is introduced by a metering tube carried by the valve assembly.

Another object is to prevent contamination of the chamber and the metering tube, whereby the accuracy of the metering tube is not impaired.

A further object is to provide a unit for filtering the carbon dioxide metered into the chamber which is readily accessible for removal and replacement.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

Fig. 1 is a fragmentary side view, partly in elevation and partly in section, illustrating time delay apparatus in accordance with the invention.

Fig. 2 is a fragmentary sectional view taken along the line 2—2 of Fig. 1.

Fig. 3 is a sectional view taken along the line 3—3 on Fig. 1.

Referring to the drawings, time delay apparatus is shown which comprises a container 10 and a valve assembly connected to the container. The container provides a chamber of a predetermined capacity into which carbon dioxide is introduced, and has a neck or spud 11 formed with a threaded opening 12. The valve assembly comprises a valve 14, a control head 15 and a metering tube 16 (Fig. 1).

The valve includes a body 20 having an inlet 21, an outlet 22, a valve seat 24 between the inlet and the outlet, a cylinder 25 and a threaded nipple section 26 adapted for securement in the container opening 12. The body is formed with a passageway 27 which extends from within the container through the section 26 and communicates with the inlet of the valve body. The body is also formed with a second passageway 29 which extends from the interior of the container to the cylinder 25, and is formed with a third passageway 30 for establishing fluid flow communication between the inlet and the cylinder in the manner described hereinafter.

The valve further includes a main valve 31 for the seat 24, a spring 32 for normally urging the valve member on its seat, and a piston 34 having a stem 35 for unseating the valve member.

The passageway 27 comprises an axial bore 36, an offset bore 37 parallel to the bore 36 and extending to the exterior of the section 26 within the container, and a port 39 connecting the bores 36 and 37. A plug 40 carrying the metering tube 16 is secured into the lower end of the bore 37.

In order to filter the carbon dioxide before it passes through the bore of the metering tube 16 and remove particles therefrom which might block the bore of the tube, a filter unit 41 is positioned in the passageway 27, preferably across the port 39. Removal and replacement of the filter unit are facilitated by providing a bore 42 in axial alignment with the port 39 and extending from the port to the exterior of the valve body, which bore is adapted to house the filter unit, and a closure 44 screw threadedly secured in the bore 42 including means for urging the filter unit towards the port, such as a spring 45.

The passageway 30 includes an intermediate threaded section having a pilot valve assembly secured therein which comprises a housing 46 having a pilot valve seat 47 at the upper end, a pilot valve member 49 for the seat having a stem 50 extending through the seat, a filter disc 51 secured into the lower end of the housing 46 and a spring 52 engaging the filter disc for urging the pilot valve member against its seat.

The control head 15 is manually operable and includes a stem 54 for engaging the pilot valve stem to effect unseating of the pilot valve member, whereby carbon dioxide under pressure flows into the cylinder 25 to actuate the piston 34.

If desired, a check valve 55 is provided in the passageway 30 near the cylinder to prevent carbon dioxide from flowing towards the pilot valve.

In operation, when carbon dioxide is introduced into the valve body by way of its inlet 21, the carbon dioxide flows through the passageway 27, is filtered, and then flows through the bore of the tube 16 and is metered into the container chamber. When the carbon dioxide in the chamber within a predetermined time builds up a sufficient pressure, it is effective to operate the piston 34 and open the main valve. Should it be desired to open the main valve before the delay time has expired, the control head 15 is operated to open the pilot valve and permit carbon dioxide to enter the cylinder by way of the passageway 30.

In the event the main valve is opened in the latter manner, the filter disc 51 prevents particles of foreign matter from entering the cylinder and eventually getting into the container chamber and then into the bore of the metering tube to clog the same. By providing filter means in both passageways 27 and 30 only filtered carbon dioxide can pass through the metering tube.

From the foregoing description it will be seen that the present invention provides an improved valve assembly for use in connection with time delay apparatus in the manner set forth herein.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. Time delay apparatus comprising a container; a valve body having an inlet chamber, an outlet chamber, a vertical partition including a valve seat between said inlet and outlet chambers, horizontal cylinder means at one side of said body and facing said outlet chamber and a vertical lower end section beneath said partition secured to said container and formed with passageway means extending from said container to said inlet chamber and formed with second passageway means extending from said container to said cylinder means, said inlet and outlet chambers each having an opening at opposite sides of said body and in horizontal alignment with each other and perpendicular with respect to the longitudinal axis of said cylinder means; a metering tube mounted at the exterior end of said first mentioned passageway means and extending into said container; a valve for said seat normally seated thereon and disposed in said inlet chamber; and piston means in said cylinder means for effecting unseating of said valve member.

2. Apparatus according to claim 1, wherein said first mentioned passageway means include a pair of offset bores, a port connecting said offset bores, and a bore in axial alignment with said port extending to the exterior of said section, and wherein a cylindrical filter element is positioned with one end adjacent said port and closure means engages said element and seals the exterior end of said last mentioned bore.

3. Apparatus according to claim 2, wherein said closure means include a resilient member for urging said element towards said port.

4. Apparatus according to claim 1, wherein said valve body has third passageway means extending from said valve body inlet chamber to said cylinder means, and wherein a pilot valve positioned above said inlet chamber controls the flow of fluid through said third passageway means.

References Cited in the file of this patent

UNITED STATES PATENTS

| | | |
|---|---|---|
| 2,183,346 | Buchanan | Dec. 12, 1939 |
| 2,398,775 | Beekley | Apr. 23, 1946 |
| 2,515,215 | Griggs | July 18, 1950 |
| 2,537,009 | Allen | Jan. 9, 1951 |
| 2,602,466 | Mapes | July 8, 1952 |
| 2,663,153 | Grant | Dec. 22, 1953 |
| 2,670,760 | Erikson | Mar. 2, 1954 |